United States Patent
Hain et al.

(10) Patent No.: US 7,664,645 B2
(45) Date of Patent: Feb. 16, 2010

(54) INDIVIDUALIZATION OF VOICE OUTPUT BY MATCHING SYNTHESIZED VOICE TARGET VOICE

(75) Inventors: Horst-Udo Hain, Munich (DE); Klaus Lukas, Munich (DE)

(73) Assignee: SVOX AG, Zurich (CH)

( * ) Notice: Subject to any disclaimer, the term of this patent is extended or adjusted under 35 U.S.C. 154(b) by 888 days.

(21) Appl. No.: 11/077,153

(22) Filed: Mar. 11, 2005

(65) Prior Publication Data
US 2005/0203743 A1 Sep. 15, 2005

(30) Foreign Application Priority Data
Mar. 12, 2004 (DE) .................. 10 2004 012 208

(51) Int. Cl.
*G10L 13/06* (2006.01)
(52) U.S. Cl. .................. 704/269; 704/250; 704/220; 704/251; 704/270
(58) Field of Classification Search .................. 704/231, 704/251, 220, 270–278, 250, 269
See application file for complete search history.

(56) References Cited

U.S. PATENT DOCUMENTS

| | | | |
|---|---|---|---|
| 5,007,081 A * | 4/1991 | Schmuckal et al. | 379/354 |
| 5,327,521 A * | 7/1994 | Savic et al. | 704/272 |
| 5,473,666 A * | 12/1995 | Szczebak et al. | 379/3 |
| 5,594,786 A * | 1/1997 | Chaco et al. | 379/93.09 |
| 5,717,828 A * | 2/1998 | Rothenberg | 704/251 |
| 5,774,841 A * | 6/1998 | Salazar et al. | 704/225 |
| 6,336,092 B1 | 1/2002 | Gibson et al. | |
| 6,349,277 B1 * | 2/2002 | Kamai et al. | 704/207 |
| 2002/0055843 A1 | 5/2002 | Sakai | |

FOREIGN PATENT DOCUMENTS

| | | |
|---|---|---|
| DE | 198 41 683 A1 | 5/2000 |
| DE | 19841683 A1 | 5/2000 |
| DE | 101 28 882 | 2/2002 |
| DE | 102 07 875 A1 | 8/2003 |
| DE | 10207875 A1 | 8/2003 |
| DE | 698 11 656 T2 | 10/2003 |
| JP | 2002-23777 | 1/2002 |

OTHER PUBLICATIONS

Stylianou, Y. et al., ("Continuous probabilistic transform for voice conversion", Speech and Audio Processing, IEEE Transactions on vol. 6, Issue 2, Mar. 1998 pp. 131-142).*

Schwardt, L.C. et al., ("Voice conversion based on static speaker characteristics", Communications and Signal Processing, 1998. COMSIG '98. Proceedings of the 1998 South African Symposium on Sep. 7-8, 1998 pp. 57-62).*

(Continued)

*Primary Examiner*—Vijay B Chawan
(74) *Attorney, Agent, or Firm*—Staas & Halsey LLP

(57) ABSTRACT

The voice of a synthesized voice output is individualized and matched to a user voice, the voice of a communication partner or the voice of a famous personality. In this way mobile terminals in particular can be originally individualized and text messages can be read out using a specific voice.

18 Claims, 1 Drawing Sheet

OTHER PUBLICATIONS

Kumar, A.; et al., ("Using phone and diphone based acoustic models for voice conversion: a step towards creating voice fonts" Multimedia and Expo, 2003. ICME '03. Proceedings. 2003 International Conference on vol. 1, Jul. 6-9, 2003 pp. I-393-I-396).*

Mizuno, H. et al., ("Voice conversion based on piecewise linear conversion rules of formant frequency and spectrum tilt", Acoustics, Speech, and Signal Processing, 1994. ICASSP-94., 1994 IEEE International Conference on vol. i, Apr. 19-22, 1994 pp. I/469-I/472 vol. 1).*

Valbret, H.; et al., ("Voice transformation using PSOLA technique", Acoustics, Speech, and Signal Processing, 1992. ICASSP-92., 1992 IEEE International Conference on vol. 1, Mar. 23-26, 1992 pp. 145-148 vol. 1).*

Sundermann, D.; et al., ("VTLN-based voice conversion", Signal Processing and Information Technology, 2003. ISSPIT 2003. Proceedings of the 3rd IEEE International Symposium on Dec. 14-17, 2003 pp. 556-559).*

English Abstract for Japanese Published Patent Application 200202377A, Jan. 25, 2002.

* cited by examiner

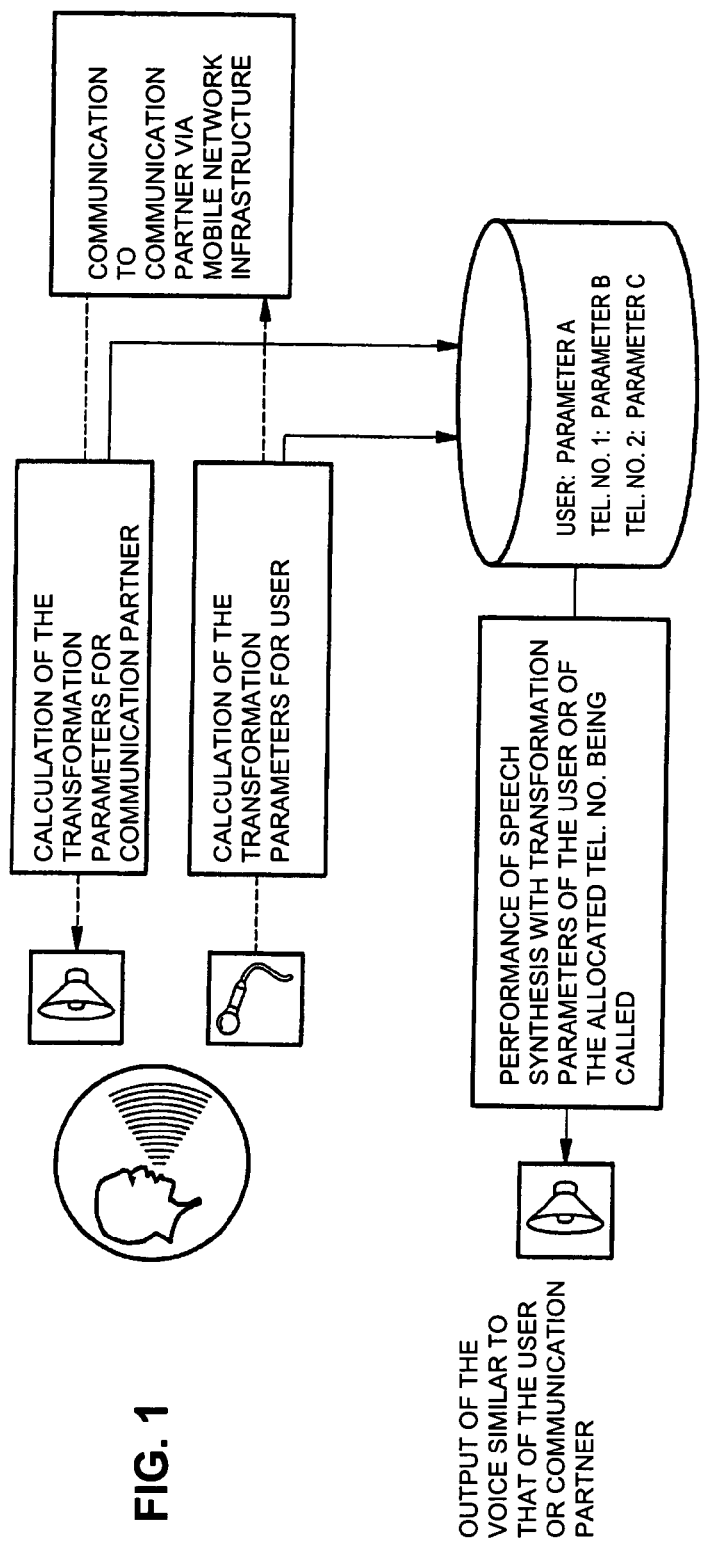

INDIVIDUALIZATION OF VOICE OUTPUT BY MATCHING SYNTHESIZED VOICE TARGET VOICE

CROSS REFERENCE TO RELATED APPLICATIONS

This application is based on and hereby claims priority to German Application No. 10 2004 012 208.3 filed on 12 Mar. 2004, the contents of which are hereby incorporated by reference.

BACKGROUND OF THE INVENTION

The emotionalization of mobile terminals is an increasing factor in the sales strategy. Personalization by logos and ring tones as well as flexible interface designs and individual mobile phone designs are thus coming more and more to the fore. Voice interaction also makes possible new communications structures to the terminal thereby allowing more natural and individual interactions.

In addition to convenient voice input, voice output is also an important future product characteristic since a handsfree communication can be realized in this way. By using acoustic feedback, this handsfree communication allows voice interaction without manual intervention and can thus be used for example, in motor vehicles, with a plugged-in mobile or when jogging.

Text-to-speech systems are currently available either equipped with standard speakers or with corporate voices, which allow a product-specific alignment of the voice and the text-to-speech speaker.

SUMMARY OF THE INVENTION

An underlying object of the invention is to provide a possibility of individualizing the voice output, which offers mobile terminal customers a new incentive to buy.

Accordingly, in a method for speech synthesis on a device, a synthesized voice which serves to output the synthesized speech is adapted to a target voice, so that the synthesized voice is similar to the target voice. For example, the target voice may be the voice of the user of the device.

Explicit training for recording one's own voice is often unacceptable as a basis for a newly synthesized voice output. It is therefore advantageous if data for matching the synthesized voice to the target voice is obtained from voice signals spoken into the device by the user for purposes other than matching the synthesized voice to the target voice. The data for matching the synthesized voice to the target voice may be transformation parameters.

The device is preferably a communication device into which the user speaks to communicate with a real human communication partner. The data for matching the synthesized voice to the target voice is then obtained from voice signals spoken into the device by the user for communication with the communication partner.

Alternatively or in addition, the target voice can be the voice of the communication partner, by which the user communicates via the device. An explicit training for recording the voice of the communication partner as a basis for a newly synthesized voice output is, as a rule, not to be carried out with regard to the communication partner. Data for matching the synthesized voice to the target voice is therefore preferably obtained from speech signals transmitted and spoken by the communication partner for communication with the user.

In particular, the synthesized voice is matched as much as possible to the target voice, so that the gender of the communication partner can be recognized.

With communication via a communication device, nowadays practically every communication partner has a communication identifier, in the form of a telephone number or a URL for example. If this communication identifier is assigned to the target voice, a call from the communication partner can be announced with a synthesized voice similar to his or her voice. Similarly, a text message from the communication partner may be read out using a synthesized voice similar to his or her voice, if the synthesized voice is matched to the target voice.

If the performance of the device is not sufficient to communicate and match the synthesized voice to the target voice at the same time, the speech signals can be stored in the form of signals representing speech during the communication. Once communication has ended, the data from these stored speech signals is obtained to match the synthesized voice to the target voice.

Experience has shown that mobile telephones are used less and less for making calls. This can result in the problem that the voice of a communication partner is no longer available. Therefore alternatively or in addition, the target voice can be the voice of a third party, a known figure for example. The data for matching the synthesized voice to the target voice is then obtained from information loaded via a network, for example the Internet, which represent the target voice for example, in the form of a recording.

An apparatus embodying the invention may be embedded hardware, a mobile terminal, a personal digital assistant or a device with mobile telephone functions to particularly effectively use the advantageous individualization.

An apparatus according to an aspect of the invention performs speech synthesis and matches a synthesized voice to a target voice for outputting synthetic speech to a target voice.

The method may be implemented by storing instructions, such as code segments, on a computer readable medium for controlling a processor using suitable programming language (s) in a program which is understood as a commercial product in terms of a program product. It can be present in any form, distributed for example on paper, on a machine readable data carrier or via a network.

BRIEF DESCRIPTION OF THE DRAWINGS

These and other objects and advantages of the present invention will become more apparent and more readily appreciated from the following description of an exemplary embodiment, taken in conjunction with the accompanying drawing(s) in which:

FIG. 1 is a block diagram of speech synthesis according to an aspect of the invention.

DETAILED DESCRIPTION OF THE PREFERRED EMBODIMENT

Reference will now be made in detail to the preferred embodiments of the present invention, examples of which are illustrated in the accompanying drawing(s), wherein like reference numerals refer to like elements throughout.

An exemplary embodiment for speech synthesis is based on the fact that the telephone conversation conducted using a mobile terminal forms the basis for a voice adaptation and thus, the speech synthesis system of the mobile terminal speaks using a voice similar to the user's voice or to the voice of a communication partner. With this voice conversion method, the original synthesized voice is matched to a target voice by manipulating the speech signal.

Since the mobile terminal can assign the users' voice to the microphone channel and a specific subscriber's number to the loudspeaker channel, storage of telephone call segments assigned to one of these voices is possible with the respective voice content.

From the telephone call segments containing the useable voice components, the user voice for adaptation is broken down into different voice features, thereby determining the transformation values and/or warping values. Using the transformation values, a voice similar to that of the user can be generated from the predetermined standard voice. The acoustic feedback thus appears to the user more familiar and more personalized.

The matched user voice can be used for reading out text messages using Short Message Service (SMSs), E-mails or system messages.

In addition to adapting to the user, the method can also be implemented for a communication partner. The communication partner's call can thus be announced using his or her voice or at least a similarly sounding voice.

The transformation parameters from the telephone calls can either be computed at run time or, if there is insufficient CPU power, can simply be stored during the acoustic coding/decoding and computed at a later standby time in the mobile terminal. In the latter case however, only a small part of a telephone call can be evaluated as a result of the memory restriction.

The method can also be applied to data material of popular people and thus for example a download of the synthetic speech of these figures can be realized. SMSs can be read out using the voice of a favorite singer; actor or politician for example.

FIG. 1 is a block diagram of speech synthesis according to an aspect of the invention. The upper part shows the computation of transformation parameters (data) from call conversation segments. The transformation parameters for the communication partner or his/her voice are computed as a result of speech signals which are routed to the loudspeaker via the output channel of the product. The transformation parameters for the user or his/her voice as a target voice are computed by evaluating the speech signals entered into the input channel by the user using a microphone.

The transformation parameters are assigned call numbers and stored. For example, the parameter A is stored for the user, the parameter B for telephone number 1, the parameter C for telephone number 2.

Finally, the transformation parameters are used for speech synthesis. The speech synthesis is carried out using user transformation parameters and/or the assigned calling telephone number. The output takes place using a voice similar to the user and/or the communication partner.

The provision of voice output in a voice similar to that of the user or a communication partner allows a completely new product feature to be provided for mobile terminals. The proposed method offers decisive advantages precisely for the marketing of emotional and user adapted product features. Output in a voice similar to the user and/or communication partner is interesting particularly in terms of avatars, for example for reading out incoming SMSs with the voice of the sender and with a lip animated display of a suitable calling face image, which can similarly be personalized to the sender.

The method can use available speech synthesis components and requires no specific additional hardware. The method can thus be implemented in a cost-effective manner.

If the feature is not desired by the user, the standard voice of the speech synthesis can be reused at any time.

A specific data volume of recorded calls is necessary for the method. If for example, the user is shown that additional calls are necessary, he or she can obtain the required dataset more quickly himself or herself by calling more frequently and increase or further match the voice quality. This in turn offers the network provider an interesting potential for increasing the air time.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV,* 69 USPQ2d 1865 (Fed. Cir. 2004).

What is claimed:

1. A method embodied in a communication apparatus for speech synthesis, the method comprising:
    capturing speech signals related to one or more target voices and calculating transformation values of each of the target voices by evaluating voice features of the speech signals;
    assigning a unique communication identifier to the transformation values for each respective target voice; and
    matching a synthesized voice of the communication apparatus to one of the one or more target voices based on transformation values assigned to a selected communication identifier.

2. A method according to claim 1, wherein at least one of the one or more target voices is a voice of a user of the communication apparatus.

3. A method according to claim 2, further comprising obtaining data for matching the synthesized voice to at least one of the one or more target voices from speech signals spoken into the communication apparatus by the user.

4. A method according to claim 3, wherein said obtaining uses the speech signals spoken into the communication device by the user for communication to obtain the data for matching the synthesized voice to the at least one target voice.

5. A method according to claim 4, further comprising:
    storing the speech signals during the communication,
    wherein said obtaining of the data for matching the synthesized voice to the at least one target voice uses the stored speech signals after the communication has ended.

6. A method according to claim 1, wherein at least one of the one or more target voices is a voice of a communication partner of a user of the communication apparatus.

7. A method according to claim 6, further comprising obtaining data for matching the synthesized voice to at least one of the one or more target voices from speech signals transmitted by the communication partner for communication with the user of the communication apparatus.

8. A method according to claim 7, further comprising:
    storing the speech signals during the communication,
    wherein said obtaining of the data for matching the synthesized voice to the at least one target voice uses the stored speech signals after the communication has ended.

9. A method according to claim 1, further comprising downloading data for matching the synthesized voice to the target voice via a network.

10. A method according to claim 1, wherein the communication apparatus is at least one of embedded hardware, a mobile terminal and communication apparatus with a mobile telephone function.

11. A communication apparatus for speech synthesis, comprising:
   means for capturing speech signals related to one or more target voices;
   means for calculating transformation values of each of the target voices by evaluating voice features of the speech signals;
   means for assigning a unique communication identifier to the transformation values for each respective target voice; and
   means for matching a synthesized voice of the communication apparatus for output of synthesized speech to one of the one or more target voices based on transformation values assigned to a selected communication identifier.

12. An apparatus according to claim 11, wherein the communication apparatus is at least one of embedded hardware, a mobile terminal and a communication apparatus with a mobile telephone function.

13. A computer readable medium encoded with a program for performing speech synthesis of a communication apparatus, the program when executed by a processor causes the processor to perform a method comprising:
   capturing speech signals related to one or more target voices and calculating transformation values of each of the target voices by evaluating voice features of the speech signals;
   assigning a unique communication identifier to the transformation values for each respective target voice; and
   matching a synthesized voice of the communication apparatus to one of the one or more target voices based on transformation values assigned to a selected communication identifier.

14. A computer readable medium according to claim 13, wherein at least one of the one or more target voices is a voice of one of a user of the device and a communication partner of the user.

15. A computer readable medium according to claim 14, wherein said method further comprises obtaining data for matching the synthesized voice to at least one of the one or more target voices from speech signals spoken into the communication apparatus by one of the user and the communication partner of the user.

16. A computer readable medium according to claim 15, wherein said obtaining uses the speech signals spoken into the communication apparatus by the one of the user and the communication partner of the user for communication to obtain the data for matching the synthesized voice to the at least one target voice.

17. A computer readable medium according to claim 16, further comprising storing the speech signals during the communication,
   wherein said obtaining of the data for matching the synthesized voice to the at least one target voice uses the stored speech signals after the communication has ended.

18. A method embodied in a communication apparatus for speech synthesis, the method comprising:
   capturing speech signals related to one or more target voices and calculating warping values of each of the target voices by evaluating voice features of the speech signals;
   assigning a unique communication identifier to the warping values for each respective target voice; and
   matching a synthesized voice of the communication apparatus to one of the one or more target voices based on warping values assigned to a selected communication identifier.

* * * * *